United States Patent [19]
Shih et al.

[11] Patent Number: 5,736,232
[45] Date of Patent: Apr. 7, 1998

[54] HIGH TEMPERATURE COMPOSITE AND METHOD

[75] Inventors: Wei-Teh Shih, Yorba Linda; James Acker Tallon, Buena Park; Ashok Kumar Janah, Manhattan Beach, all of Calif.

[73] Assignee: The B. F. Goodrich Company, Akron, Ohio

[21] Appl. No.: 366,721

[22] Filed: Jun. 15, 1989

[51] Int. Cl.[6] ............................................. B32B 5/00
[52] U.S. Cl. .................. 428/210; 428/113; 428/408; 428/221; 428/222; 427/208.8; 427/228; 427/419.2; 427/419.6; 427/419.7
[58] Field of Search .................... 428/408, 113, 428/210, 221, 222; 427/208.8, 228, 419.2, 419.6, 419.7; 419/2, 7, 13, 23

[56] References Cited

U.S. PATENT DOCUMENTS

| 4,318,948 | 3/1982 | Hodgson | 428/68 |
|---|---|---|---|
| 4,397,901 | 8/1983 | Warren | 428/101 |
| 4,500,602 | 2/1985 | Patten et al. | 428/101 |
| 4,671,997 | 6/1987 | Galasso et al. | 428/408 |
| 4,766,013 | 8/1988 | Warren | 427/228 |
| 4,795,677 | 1/1989 | Gray | 428/246 |
| 4,830,919 | 5/1989 | Shuford | 428/408 |
| 4,863,773 | 9/1989 | Rousseau et al. | 428/68 |
| 4,868,056 | 9/1989 | Haselkorn | 428/408 |
| 4,892,783 | 1/1990 | Brazel | 428/282 |
| 4,892,790 | 1/1990 | Gray | 428/548 |
| 4,894,286 | 1/1990 | Gray | 428/408 |
| 4,937,101 | 6/1990 | Gray | 427/228 |

Primary Examiner—Ngoclan Mai
Attorney, Agent, or Firm—David M. Ronyak

[57] ABSTRACT

A carbon/carbon composite having an oxidation protection outer coating system comprising a coating of a glass, a coating of a ceramic, and a wrap of a ceramic containing fabric.

17 Claims, 1 Drawing Sheet

HIGH TEMPERATURE COMPOSITE AND METHOD

FIELD OF THE INVENTION

This invention relates to structures formed from carbonaceous fiber and densified principally employing carbon, or so-called carbon/carbon structures. More particularly this invention relates to such carbon/carbon structures capable of sustained use at elevated temperatures and repeated cycling between elevated and less elevated temperatures. Specifically this invention relates to such carbon/carbon structures capable of sustained operation at temperatures exceeding 2000° F. (1093° C.) in an oxygen containing environment.

BACKGROUND OF THE INVENTION

Carbon/carbon structures include those structures formed from a fibrous reinforcement which itself consists principally of carbon and are densified for enhanced strength employing principally carbon. In these structures, the carbon may exist in amorphous, graphitic, or other structured intermolecular arrangement. Such carbon/carbon structures typically are characterized by desirably elevated strength and low density together with attractive thermal conductivity and latent heat properties. Such structures, conventionally, find utility in the formation of wheel brakes for aircraft, rotor brakes for helicopters as well as nose cones for missiles, rocket nozzles, high temperature engine components, shields, and the like.

This inherent strong but lightweight characteristic and a capability for sustained exposure to elevated temperatures without melting or flowing can make carbon/carbon a material of choice for high temperature applications. Carbon/carbon is not, however, totally immune to the effects of elevated temperature. Particularly, at temperatures exceeding 1200° F. (665° C.) carbon/carbon structures in an oxidizing environment such as the earth's atmosphere tend to lose weight with the passage of time, and at some point thereby strength. The rate of weight loss can prompt concern where a device formed from carbon/carbon is subjected to structural loading or structural stresses. Accordingly, identification of methods and mechanisms for reducing or eliminating such a weight loss and accompanying loss of strength associated with the operation of carbon/carbon structures at elevated temperatures has been, from time to time, the subject of investigation and development.

In reducing the opportunity for a weight loss from carbon/carbon structures exposed to or operated in environments characterized by substantially elevated temperatures and an oxidizing, especially oxygen containing, environment, one approach has been to reduce opportunities for intimate or permeating contact between the carbon/carbon structure and any oxidizing environment in which such structure exists or is operated. One mechanism for reducing such contact has focused upon the sealing of exterior surfaces of a carbon/carbon structure exposed to such an environment forestalling or foreclosing the entry of oxidizing agents thereinto.

It has been proposed that exterior surfaces of a carbon/carbon structure be coated with a ceramic material such as a silicon carbide to forestall the entry of oxidizing agents, typically atmospheric molecular or ionic oxygen, into such a carbon/carbon structure. The oxidizing agent thereby becomes unavailable to combine with the carbon within the structure to produce a volatile gas such as carbon dioxide which, upon being lost again to the atmosphere completes effectuation of a weight loss in the carbon/carbon structure. Such ceramic coatings, while meeting with limited success, have been characterized by a tendency to crack as a result, primarily, of thermal cycling of a coated structure or impact. Oxidizing agents may thereafter enter through such cracks and function as agents to produce a deleterious weight loss in the carbon/carbon structure. As to thermal cycling, such cracking caused thereby, it is believed, is in part attributable to differences in the rate of thermal expansion and contraction for the structure and the coating, finding root in differences between the coefficients of thermal expansion for any such ceramic coating and the carbon/carbon structure to which the coating is applied.

In alternative proposals, exterior surfaces of carbon/carbon structures have been coated with a single or multi-component glass-forming seal-coat such as a boron or zirconia contained substance tending to form a glass-like or glass-ceramic material having self-healing properties as a result, at least in part, of being to a degree flowable and amorphous in character at the temperatures (e.g. 2000°–2400° F. or 1093°–1316° C.) associated with the environment in which it is desired the carbon/carbon structure be protected from an oxidizing environment. Such glass-formers have tended to demonstrate a reduced ability to protect carbon/carbon structures in a temperature range of between about 1200° F. and 1400° F. (649° C.–760° C.), a temperature range in which carbon/carbon structures are particularly susceptible to oxidation and in which range, at least from time to time, it is desired that carbon/carbon structures intended also for use at more elevated temperatures, be maintained or operated. One possible explanation for the somewhat disappointing performance of such glass-forming materials when applied over exterior surfaces of carbon/carbon structures at, e.g. temperatures of 1200°–1400° F., lies in a tendency for the glass-formers at those temperatures to be more solid than flowable. These glass formers are, at such temperatures, more susceptible to cracks, in part due to a significant differential between the coefficient of thermal expansion for such typical glass-forming materials and the coefficients of thermal expansion for the carbon/carbon structures to which the glass-formers are applied.

In still other proposals, oxidation inhibiting materials have been included within the carbon/carbon structure. These oxidation inhibiting substances have included such diverse materials as phosphoric acid employed commonly in carbon brakes, but may also include boron or boron-oxide containing substances. Such anti-oxidation additives have typically proved less than desirably satisfactory in protecting carbon/carbon structures at both temperatures in the range of 1200°–1400° F. and at temperatures in excess of about 2000° F.

A mechanism for protecting carbon/carbon structures effective in forestalling significant weight loss at temperatures in excess of about 2000° F. and preferably at temperatures in excess of about 2400° F. and effective as well in protecting such structures from oxidation at temperatures in a range of 1200°–1400° F. could find substantial utility in the manufacture of so-called carbon/carbon hot structures suitable for use at these elevated temperatures.

SUMMARY OF THE INVENTION

The present invention provides an improved means and method for providing oxidation protection to a carbon/carbon composite or structure. By the term carbon/carbon as used herein what is meant is a carbonaceous substrate having interstitial spaces therein, the interstitial spaces being filled at least in substantial part employing a carbonaceous material formed by the vapor deposition of carbon containing compounds or the breakdown products thereof, or by infiltration of the interstices employing an organic material which then subsequently is carbonized.

In the method, a carbon/carbon precursor is provided. Desired exterior surfaces of the carbon/carbon precursor are provided with at least one wrapping ply of a ceramic-containing fabric. The carbon/carbon precursor is densified to provide a carbon/carbon structure. A glass sealant is applied to desired exterior portions of the carbon/carbon structure covered by the ceramic fabric ply. A ceramic coating is applied to at least exterior portions of the carbon/carbon structure covered by the ceramic-containing fabric ply.

The carbon/carbon precursor may be in one of preform, that is greenware, densified, or partially densified form. In the practice of the invention the carbon/carbon precursor may be processed with the ceramic-containing fabric ply comprising the external surface of the composite, or the ceramic-containing fabric ply may be affixed to the carbon/carbon composite after processing of the carbon/carbon composite for densification purposes is completed. In preferred embodiments, at least some densification of the carbon/carbon composite precursor is accomplished prior to application of the ceramic-containing fabric ply to surfaces thereof.

Structures made in accordance with the invention may include within the structure thereof at least one oxidation protection agent and include thereover glass and/or ceramic coatings providing oxidation protection at elevated temperatures. A glass coat optionally including a ceramic component coat are applied thereover after all densification of the carbon/carbon composite structure has been accomplished and a ceramic coating is further applied thereover.

The above and other features and advantages of the invention will become more apparent when considered in light of a detailed description of the invention and a drawing comprising two figures which follow, together forming a part of the specification.

BEST EMBODIMENT OF THE INVENTION

Figure 1:
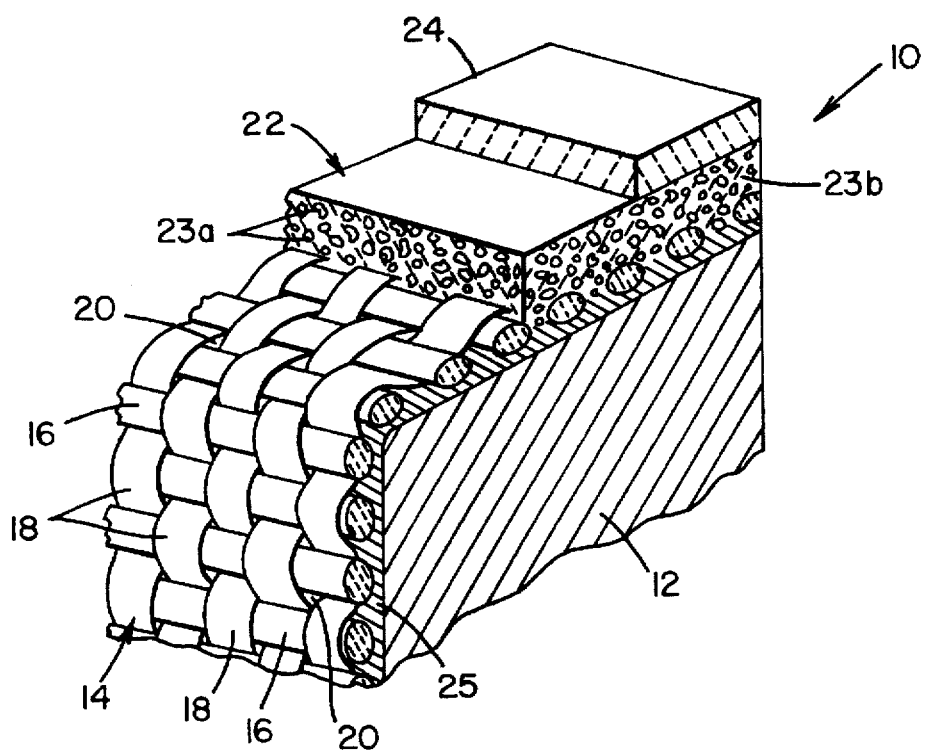
FIG. 1 is a representation of a portion of a carbon/carbon composite structure made in accordance with the invention.
Figure 2:
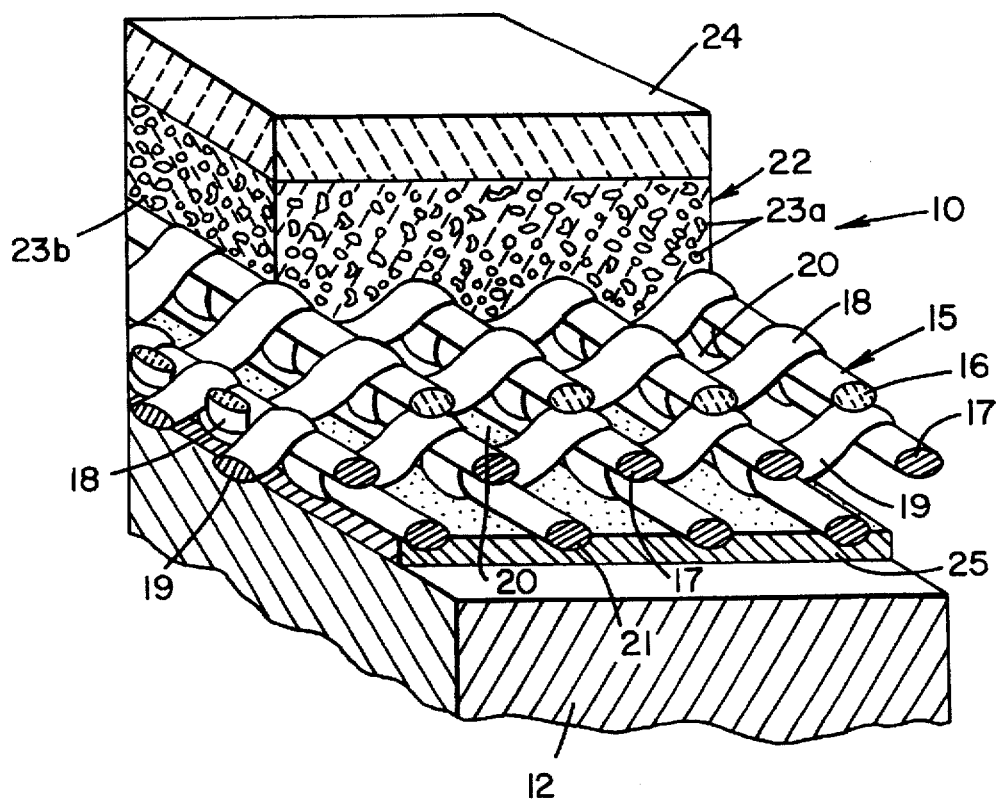
FIG. 2 is a representation of a portion of a carbon/carbon composite structure made in accordance with the invention.

Referring to the drawings, FIGS. 1 and 2 depict portions of carbon/carbon composite structures 10 made in accordance with the invention. The structures 10 include a carbon/carbon substrate 12 having applied thereover a ceramic-containing fabric wrapping ply 14 in FIG. 1 and a ceramic-containing fabric wrapping ply 15 in FIG. 2. The ceramic-containing wrapping ply 14 includes warp 16 and weave or woof 18 strands therein which function to define a plurality of pockets 20. In the ceramic-containing fabric wrapping ply 15 depicted in FIG. 2, a plurality of ceramic warp fibers 16 and one or more plies including carbon warp fibers 17, 21 function with layers of ceramic weave fibers 18 and one or more layers of carbon weave fibers 19 again to define a plurality of pockets 20.

While in the embodiment depicted in FIG. 2 the ceramic-containing fabric wrapping ply includes a single layer of ceramic warp fibers 16, additional plies of ceramic fabric including warp fibers 16 may be employed in the practice of the invention. Likewise, although in FIG. 2 two fabric plies including therein carbon warp fibers 17, 21 are depicted, a greater number or fewer number of fabric plies including ceramic warp fibers 17, 21 may be employed in the practice of the invention from the single ply depicted in FIG. 2.

By referring to FIGS. 1 and 2, it may be seen that what is meant by ceramic-containing fabric wrapping ply is a wrapping ply formed of one or more plies of fabric containing therein ceramic and optionally carbon fibers. The ceramic-containing fabric wrapping plies 14, 15 hereinafter shall be referred to simply as wrapping plies 14, 15 for the sake of convenience.

The wrapping plies 14, 15 include at least a 25% ceramic content therein and preferably 50%, all by weight. The wrapping plies 14, 15 are formed of suitable ceramic materials employed as fibers utilized in forming the fabric and, optionally, carbonaceous material suitable for forming a desired fabric. The weave structure of the wrapping ply 14, 15 may include woven, braided, or knit ceramic fibers and may include co-woven, co-braided or co-knitted ceramic and carbon fibers having a ceramic fiber volume percent gradient through the thickness of the wrapping ply 15 whereby a greater proportion of the fabric wrapping ply 15 is formed of a carbon material adjacent to substrate 12 and a greater proportion of the wrapping ply 15 is formed of ceramic fibers in portions of the ply 15 not immediately adjacent to substrate.

An equally preferred embodiment of the wrapping ply 15 includes individual plies of a fabric formed of ceramic warp and weave fibers stitched or knitted together with a ply of fabric formed from warp and woof strands of carbon fiber.

Suitable weaves of ceramic fibers are commercially available and configured for utility in practicing the embodiment of the invention pictured in FIG. 1. Woven wrapping plies 15 as depicted in FIG. 2 may be co-woven or co-knitted ceramic fibers and carbon fibers joined together employing conventionally known weaving, knitting and stitching techniques.

Ceramic fibers suitably configured for utility in practicing the invention depicted in the embodiments of FIGS. 1 and 2 are formed from such ceramic fibers as Nextel® 312, 440, or 480 (available from 3M Company) which typically include alumina, boron oxide and silica; and Nicalon®, a silicon carbide fiber (available from Dow Corning Corporation). Also of utility in forming the wrapping ply 14 depicted in FIG. 1 are commercially available fabrics formed from alumina, zirconia, or mixtures thereof, and fabrics formed alumina and/or silica, and optionally including boron oxide therein.

The wrapping ply 15 as depicted in FIG. 2 can be formed from the ceramic fibers suitable for forming the wrapping ply 14 as depicted in FIG. 1 together with carbon fibers having commercial availability and woven by custom weavers. Such carbon fibers include T-300R, T-40 (available from Amoco Performance Products); Celion® 6000 (available from BASF); Apollo® 55 (available from Hysol Grafil); IM-6™ (available from Hercules Corporation) and carbon fibers containing metallic or glassy species in small quantities therein, the species being selected to increase oxidation resistance of the carbon fibers at elevated temperatures. The precise nature of the glassy or metallic species introduced into such fibers is a matter of experimentation for one skilled in the art depending upon the ultimate fiber property desired and may be introduced into the fibers using known techniques.

The pockets 20 as depicted in FIGS. 1 and 2 function to contain an applied coating thereover 22 of a glass or a glass and ceramic sealant mixture, hereinafter referred to as a glass coating. A further ceramic coating 24 is applied over the glass coating 22.

The carbon/carbon composite structure 10 is formed in usual conventional manner by, for example, the laying up of resin prepregged fabric to form the structure as a greenware preform, pyrolyzing the resin prepregged upon the fabric, and then densifying the structure employing suitable or conventional, well-known techniques such as: i) carbon (chemical) vapor infiltration (CVD); or ii) liquid impregnation, that is impregnating voids within the structure employing a suitable or conventional carbon based impregnant such as epoxy, furan, or phenolic resins as well as petroleum and coal tar pitch based products, and then carbonizing the impregnant. Such techniques for forming densified structures are well-known in the art.

Optionally included within internal portions of such a structure is a suitable or conventional anti-oxidation material such as phosphoric acid, boric acid dissolved in methanol, boron carbide deposited by a chemical vapor deposition, tetraethoxysilane, and mixtures thereof. Other suitable or conventional anti-oxidation materials may be employed for suppressing oxidation and such materials should be deemed as falling within the purview of the present invention. These materials become included within the carbon/carbon structure typically by inclusion within a prepregging resin material applied to fabric forming the carbon/carbon structure before a laying up of the structure is undertaken. Equally, however, such anti-oxidation materials can be introduced by chemical vapor deposition subsequent to laying up the fabric structure, by inclusion in the fabric or by inclusion in any resin introduced into interstices of the structure for purposes of densification.

In the glass coating 22, the glass employed can be of any suitable or conventional glass sealant material such as a boron or zirconium based glasses, commercially available. It is much preferred that the glass sealant 22 may be formed of a glass which, at temperatures between about 1200° and 1400° F. possesses and maintains self-healing properties. Ceramic content of the layer 22 may be provided by ceramic materials selected employing criteria essentially similar to the criteria employed for selecting ceramic materials suitable for use in forming ceramic fibers present in the wrapping plies 14, 15. In the embodiments depicted in FIGS. 1 and 2 the glass coating 22 includes a continuous glass phase 23b and a ceramic particulate phase 23a. It is much preferred that the particulate ceramic content 23a of the coating 22 be quite finely divided, by chopping, grinding or the like, prior to inclusion therein. Equally, the particulate ceramic material 23a included in the coating 22 may be selected from materials suitable for use in the coating 24.

The ceramic coating 24 typically is formed of a suitable or conventional ceramic such as hafnium carbide, boron carbide, silicon nitride, boron nitride, silicon carbide, or mixtures thereof. It is much preferred that the ceramic coating possess self-healing properties in a temperature range of between about 2000° F. (1093° C.) and about 2700° F. (1482° C.). The ceramic coating 24 must comprise, effectively, a continuous ceramic phase in order to function in the practice of the invention.

The ceramic fabric ply 14, 15 can be applied to the carbon/carbon composite structure 10 employing suitable or conventional techniques. One such technique is simply to wrap the carbon/carbon composite 10 with the wrapping ply 14, 15 and permit subsequent carbon densification of the carbon/carbon composite to function to adhere the wrapping ply 14, 15 to the carbon/carbon composite structure 10. The inclusion of carbon fibers within either the warp or woof can enhance adhesion of the fabric ply 14, 15 to the carbon/carbon composite structure 10. Alternately, the ceramic fabric ply may be adhered to the carbon/carbon composite structure at some point before, during, or after densification procedures employing a suitable or conventional adhesive. The adhesive is then pyrolyzed and subsequent densification of the carbon/carbon composite structure 10 functions to strengthen existing bonds between the wrapping ply 14, 15 and the carbon/carbon composite structure 10 imparted by the adhesive. Again, the inclusion of carbon fibers within either the warp or woof can enhance adhesion. After suitable densification, the bond established between the ceramic fabric ply and the carbon/carbon composite 10 may be indistinguishable to the naked eye from the carbon/carbon composite structure 10 in its entirety. Likewise, any anti-oxidation compounds included within the carbon/carbon composite structure 10 typically are, to the naked eye, indistinguishable from the structure after complete densification.

By the term adhesive, what is meant is a resin or a liquid which, upon heating in an inert atmosphere to a sufficiently high temperature, pyrolyzes to yield carbon or alternately, an organo-metallic ceramic liquid precursor which, on heating to sufficiently high temperatures yields a metallic carbide, oxide, nitride, or the like and mixtures thereof including mixtures with the carbonaceous material and all optionally including finally divided ceramic particulates including finely divided whiskers. Carbonaceous materials suitable for use in practice of the invention include SC-1008, a conventional phenolic resin available from Borden Chemical Company; Reichold™, a phenolic resin available from Reichold Chemical Company; pitch-based liquids such as those formed from A-240 pitch available from Ashland Chemical Company and dissolved in suitable solvents such as toulene, quinoline, tetrahydrofuran, furfurol, pyridine, and effective mixtures thereof. Suitable organo-metallic liquid ceramic precursors include polycarbosilane, a silicon carbide precursor available from Dow Corning Corporation; tetraethoxysilane, a silicon dioxide precursor available from Morton Thiokol, Inc.; zirconium n-propoxide, zirconium oxide precursor available from Morton Thiokol, Inc.; and aluminum isopropoxide, an aluminum oxide precursor available from Morton Thiokol, Inc. Ceramic particulate additives suitable for use in forming adhesive blends configured for the practice of the invention include micro precipitated silica available from Philadelphia Quartz Comp. under the designation QUSO™ and sub micron boron or boron carbide commercially available from Callery Chemical Company.

In the embodiments of FIGS. 1 and 2 the adhesive bond is depicted at the reference numeral 25. In the embodiment of FIG. 2, the wrapping ply is at least partially embedded within the adhesive. The adhesive material represented by reference numeral 25 in FIGS. 1 and 2 is either resin, pitch, metallo-organic ceramic precursors, mixtures of one or more of the foregoing, and one or more of the foregoing including mixtures of one or more of the foregoing, together with finely divided ceramic particles. The selection of a particular adhesive blend is within the purview skill of the practitioner in the art to meet desired performance characteristics in a final carbon/carbon structure 10.

Oxidation protection for the carbon/carbon composite structure 10 of the invention functions in a manner as follows. Oxygen succeeding in penetrating the carbon/carbon composite structure through any pores or cracks in the ceramic layer 24 and the glass layer 22 is inhibited by the activity of the anti-oxidation agent (if any) introduced into the carbon/carbon structure during formation thereof but typically indistinguishable to the naked eye in any final structure. The ceramic coating 24 functions substantially to preclude the entry of oxygen into interior portions of the carbon/carbon composite structure 10. This ceramic coating 24 is selected to be of a nature and configuration to remain functionally upon the outer surface of the carbon/carbon composite structure notwithstanding elevation of the carbon/carbon composite structure 10 to temperatures approaching 2700° F. At such temperatures, the coating 24 should retain a sufficient structural integrity to continue to maintain self-healingly an effective coating thickness over desired surfaces of the carbon/carbon composite structure 10 sufficient at 2200° F. to effectively preclude entry of significant quantities of oxidizing agent into the structure 10, that is those quantities likely to cause deleterious loss of carbon from the carbon/carbon composite structure 10. The ceramic coating 24 is configured to soften sufficiently at operational temperatures in a range of 2000° F. and more preferably 2200° F. to 2700° F. to facilitate self-healing of any cracks, crevices or interstices which may form therein as a result of temperature cycling or minor impact.

The glass coating 22 is formed of materials characterized by self-healing properties at temperatures in a range of about 1200° F. to 1400° F. and above. When the carbon/carbon composite structure 10 is exposed to more elevated temperatures, this coating 22 becomes substantially more liquid in character and can function thereby to seal any cracks, crevices or interstices present or developing in the ceramic coating 24 while the structure 10 is held at a temperature between approximately 1400° F. and approximately 2000° F. to 2200° F. The ceramic coating 24, of course, is selected for the characteristics of being self-healing at temperatures greater than approximately 2000° F. and more preferably 2200° F. As the composite structure 10 is cycled between elevated temperatures in the range of 2000° F. to 2700° F. and the range of 1200°–1400° F., the ceramic coating 24 may develop cracks as result of thermal stress associated with divergent coefficients of thermal expansion between the carbon of the structure 10 and the coating 24. The glass coating 22 at these intermediate temperatures, functions to seal any such thermal stress cracks in the ceramic coating thereby assuring against the entry of substantial quantities of oxidizing agent into protected portions of the carbon/carbon composite structure 10. Below the self-healing temperature of the coating 22, typically in a range of between 1200° F. and 1400° F., the carbon/carbon composite structure 10 is typically not extraordinarily susceptible to oxidation damage and substantial oxidation protection associated with an intact coating system is frequently less necessary.

Carbon/carbon structures are protected against oxidation in accordance with the invention at temperatures between 1200° F. and approximately 2700° F. by coating the carbon/carbon composite structure with at least one wrapping ply 14, 15 and then covering the wrapping with at least one glass coating 22 which may optionally contain a ceramic material and at least one coating of a ceramic 24 to a desired and effective thickness. The particular thicknesses applied and the number of wrapping ply thicknesses applied will be a function of the operational environment for the carbon/carbon composite structure 10. The application of additional wrapping ply thicknesses tends to form additional pockets 20 and inter ply interstitial spaces (not shown) useful in retaining the coatings 22, 24 upon the composite 10. The precise chemical nature of the coatings 22, 24 is a matter of some experimentation, and selection typically is in part a function of the temperatures most frequently encountered by the carbon/carbon composite structure 10 and the time durations at which different temperature profiles are encountered.

It should be clearly evident that while the wrapping plies 14, 15 are shown as discrete and separate plies distinct from the carbon/carbon composite structure 10 in FIGS. 1 and 2, these wrapping plies 14, 15 could, equally under the invention, be the surface-most plies forming the carbon/carbon composite structure 10 as a preform.

Preferably the fabric employed to form the wrapping plies 14, 15 in the practice of the invention is a finely woven fabric. By finely woven, what is meant is one formed from desirably thin strands or fibers of the ceramic and/or carbon in defining the warp 16, 17, 21, and woof 18, 19 of the fabric, the better to form a relatively large number of pockets 20 present and available for retaining the coatings 22, 24 with respect to desired surface areas area upon the carbon/carbon composite structure 10. The pockets 20 appear to function to protect the coatings 24, 22 from ablative effects and other surface removal effects otherwise impacting upon the carbon/carbon composite structure 10 during incidents where the temperature to which the carbon/carbon composite structure 10 is subjected is a temperature at which either the glass coating 22, the ceramic coating 24, or both are in a semi-liquified, self-healing state. It is preferable that the wrapping ply 14, 15 be formed of a material characterized by a substantially elevated temperature at which the material becomes less than a true solid. Emphasis upon the maintenance of a non-flowing fabric structure at elevated temperature and the selection of ceramic fiber forming the wrapping ply 14, 15 assists in assuring against ultimate dilution of capability for the wrapping ply sheltering the coatings 22 and 24. A selection of suitable ceramic fibrous material of construction is known to those skilled in the art of ceramics and includes in addition to those already identified: silicon carbide, aluminasilicate glass or ceramic compositions, alumina, zirconia stabilized with yttria.

While a preferred embodiment of the invention has been shown and described in detail, it should be apparent that various modifications may be made thereto without departing from the scope of the claims that follow:

What is claimed is:

1. A method for providing oxidation protection for a carbon/carbon composite comprising the steps of:
   providing a carbon/carbon precursor;
   adheringly providing about desired exterior surfaces of the carbon/carbon precursor at least one wrapping ply formed of a ceramic-containing fabric;
   densifying the carbon/carbon precursor to provide a carbon/carbon structure;
   applying to at least exterior portions of the carbon/carbon structure covered by the wrapping ply a glass sealant optionally including a ceramic component; and
   applying to at least exterior portions of the carbon/carbon structure covered by the glass sealant a ceramic coating.

2. The method of claim 1 including the step of: at least partially densifying the carbon/carbon precursor prior to adheringly providing the ceramic-containing wrapping ply.

3. The method of claim 2 including the step of: adhering the ceramic-containing fabric wrapping ply to the carbon/carbon precursor employing an adhesive prepreggedly applied to the ceramic-containing fabric wrapping ply and then pyrolyzing the applied adhesive.

4. The method of claim 3 including the step of: providing within the carbon/carbon structure at least one internal oxidation inhibiting agent.

5. A method for providing oxidation protection for a carbon/carbon composite structure comprising the steps of:

providing a carbon/carbon composite structure in one of preform, densified, and partially densified form;

adheringly providing about desired exterior surfaces of the carbon/carbon composite structure at least one wrapping ply of a fabric selected from a group consisting of finely woven, knitted, sewn, braided, co-woven, co-knitted, co-braided and co-sewn weave fabrics formed from fiber materials selected from a group consisting of: alumina, silica, aluminosilicate, silicon carbide, boron oxide, zirconia, mixtures thereof, and mixtures of at least one of the foregoing with carbon;

completing densification of the carbon/carbon composite structure;

applying to at least exterior portions of the carbon/carbon composite structure covered by the fabric wrapping ply a glassy sealant selected from mixtures of glasses and ceramics; and applying to at least exterior portions of the carbon/carbon composite structure covered by the fabric ply a ceramic coating selected from a group consisting of: silicon carbide; hafnium carbide; boron carbide; silicon nitride; boron nitride; and mixtures thereof.

6. The method of claim 5 including the step of: adhering the fabric wrapping ply to the carbon/carbon composite structure employing an adhesive prepreggedly applied to the fabric wrapping ply and then pyrolyzing the applied adhesive.

7. The method of claim 6 including the step of: providing within the structure of the carbon/carbon composite structure at least one oxidation inhibiting agent.

8. In a densified carbon/carbon composite structure including within the structure thereof at least one oxidation protection agent and including thereover at least one of a glass coat and a ceramic coat configured for providing oxidation protection at elevated temperatures, the improvement comprising:

a finely woven ceramic-containing fabric adheringly applied to desired exterior surfaces of the carbon/carbon composite structure as a wrapping ply;

a glass coat optionally including a ceramic component applied thereover after all desired densification of the carbon/carbon composite structure has been accomplished; and a ceramic coating applied thereover.

9. The carbon/carbon composite structure of claim 8, the fabric being formed from a material selected from a group consisting of: alumina and silica; alumina, silica and boron oxide; zirconia; silicon carbide; alumina, carbon, and mixtures thereof.

10. The carbon/carbon composite structure of claim 9, the glass/ceramic coat being formed to include a material selected from a group consisting of: boron oxide; zirconia and mixtures thereof.

11. The carbon/carbon structure of claim 10, the ceramic coating being formed from a material selected from a group consisting of: silicon carbide; hafnium carbide; boron carbide; silicon nitride; boron nitride; and mixtures thereof.

12. The carbon/carbon composite structure of claim 8, the fabric including prepreggedly applied thereto an adhesive suitable for adhering the ceramic fabric to the carbon/carbon composite structure, and the adhesive being pyrolyzed following application of the fabric as a wrapping ply to the carbon/carbon structure.

13. The carbon/carbon composite structure of claim 8 the finely woven fabric being selected from a group consisting of finely woven, knitted, sewn, braided, co-woven, co-knitted, co-braided and co-sewn weave fabrics formed from fiber materials selected from a group consisting of: alumina, silica, aluminosilicate, silicon carbide, boron oxide, zirconia, mixtures thereof, and mixtures of at least one of the foregoing with carbon.

14. The carbon/carbon composite structure of claim 9 the finely woven fabric being selected from a group consisting of finely woven, knitted, sewn, braided, co-woven, co-knitted, co-braided and co-sewn weave fabrics formed from fiber materials selected from a group consisting of: alumina, silica, aluminosilicate, silicon carbide, boron oxide, zirconia, mixtures thereof, and mixtures of at least one of the foregoing with carbon.

15. The carbon/carbon composite structure of claim 10 the finely woven fabric being selected from a group consisting of finely woven, knitted, sewn, braided, co-woven, co-knitted, co-braided and co-sewn weave fabrics formed from fiber materials selected from a group consisting of: alumina, silica, aluminosilicate, silicon carbide, boron oxide, zirconia, mixtures thereof, and mixtures of at least one of the foregoing with carbon.

16. The carbon/carbon composite structure of claim 11 the finely woven fabric being selected from a group consisting of finely woven, knitted, sewn, braided, co-woven, co-knitted, co-braided and co-sewn weave fabrics formed from fiber materials selected from a group consisting of: alumina, silica, aluminosilicate, silicon carbide, boron oxide, zirconia, mixtures thereof, and mixtures of at least one of the foregoing with carbon.

17. The carbon/carbon composite structure of claim 12 the finely woven fabric being selected from a group consisting of finely woven, knitted, sewn, braided, co-woven, co-knitted, co-braided and co-sewn weave fabrics formed from fiber materials selected from a group consisting of: alumina, silica, aluminosilicate, silicon carbide, boron oxide, zirconia, mixtures thereof, and mixtures of at least one of the foregoing with carbon.

* * * * *